(12) United States Patent
Gobillard

(10) Patent No.: US 8,146,938 B2
(45) Date of Patent: Apr. 3, 2012

(54) METHOD AND DEVICE FOR PEDALLING

(75) Inventor: Jean-Marc Gobillard, Bures sur Yvette (FR)

(73) Assignee: Dreamslide, Bures-sur-Yvette (FR)

( * ) Notice: Subject to any disclaimer, the term of this patent is extended or adjusted under 35 U.S.C. 154(b) by 975 days.

(21) Appl. No.: 12/067,809

(22) PCT Filed: Aug. 29, 2006

(86) PCT No.: PCT/FR2006/001999
§ 371 (c)(1),
(2), (4) Date: Mar. 24, 2008

(87) PCT Pub. No.: WO2007/036616
PCT Pub. Date: Apr. 5, 2007

(65) Prior Publication Data
US 2008/0217881 A1   Sep. 11, 2008

(30) Foreign Application Priority Data
Sep. 27, 2005 (FR) ..................................... 05 09871

(51) Int. Cl.
*B62M 1/02* (2006.01)
(52) U.S. Cl. ....... 280/259; 280/260; 280/261; 74/594.1; 74/594.2; 74/594.3
(58) Field of Classification Search .................. 280/259, 280/260, 261; 74/594.1, 594.2, 594.3
See application file for complete search history.

(56) References Cited

U.S. PATENT DOCUMENTS

| 4,882,945 | A | * | 11/1989 | Trevizo | 74/594.3 |
| 5,095,772 | A | | 3/1992 | Fortson et al. | |
| 5,207,119 | A | * | 5/1993 | Garneau | 74/594.3 |
| 5,540,111 | A | * | 7/1996 | Barnett et al. | 74/30 |
| 5,816,600 | A | * | 10/1998 | Matsuura | 280/260 |
| 6,830,259 | B2 | * | 12/2004 | Jakovljevic | 280/261 |
| 7,753,387 | B2 | * | 7/2010 | Wei | 280/253 |

FOREIGN PATENT DOCUMENTS

| ES | 2159222 A1 | 9/2001 |
| FR | 937252 A | 8/1948 |
| FR | 2 747 362 A | 10/1997 |
| WO | 0026080 A1 | 5/2000 |

* cited by examiner

*Primary Examiner* — Anne Marie Boehler
*Assistant Examiner* — Marlon Arce
(74) *Attorney, Agent, or Firm* — Young & Thompson

(57) ABSTRACT

A pedalling method and device for a user in standing position. The device includes a drive shaft whereof the rotation about its axis is coupled with the rotation of two right and left pedals. The pedals are mutually assembled via a plurality of cranks, connecting rods, and pivots such that: the pedals can travel freely along a circular path, for a constant rotational speed of the shaft, the speeds of the pedals are recurrent at equal time intervals but out of phase, minimal at lower dead center, maximal at upper dead center, and when the pedals are simultaneously at a common height lower than that of the center of the trajectory, the speeds of the pedals are equal. The vertical oscillation of the center of gravity of a user in standing position is reduced compared to a conventional pedal assembly.

26 Claims, 9 Drawing Sheets

Figures 9, 10:
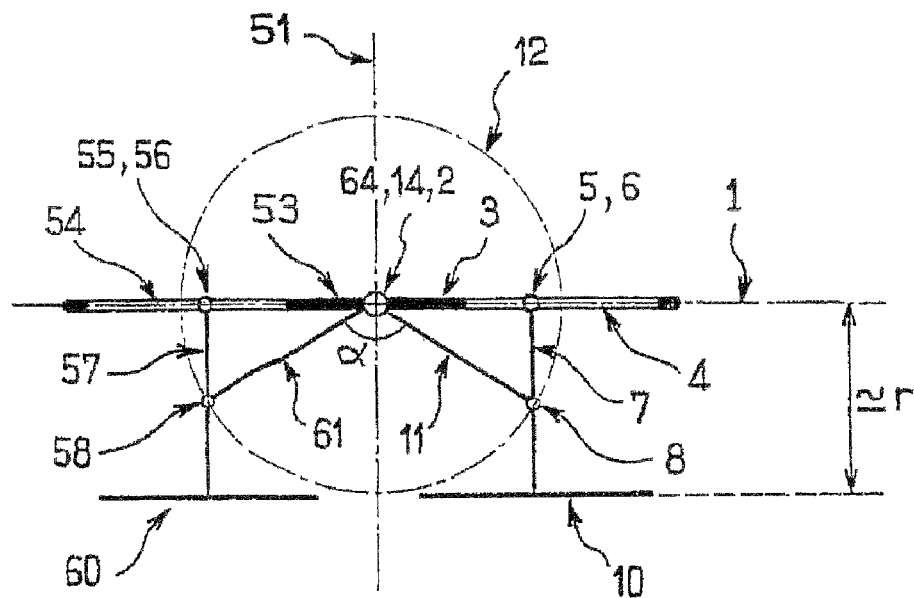

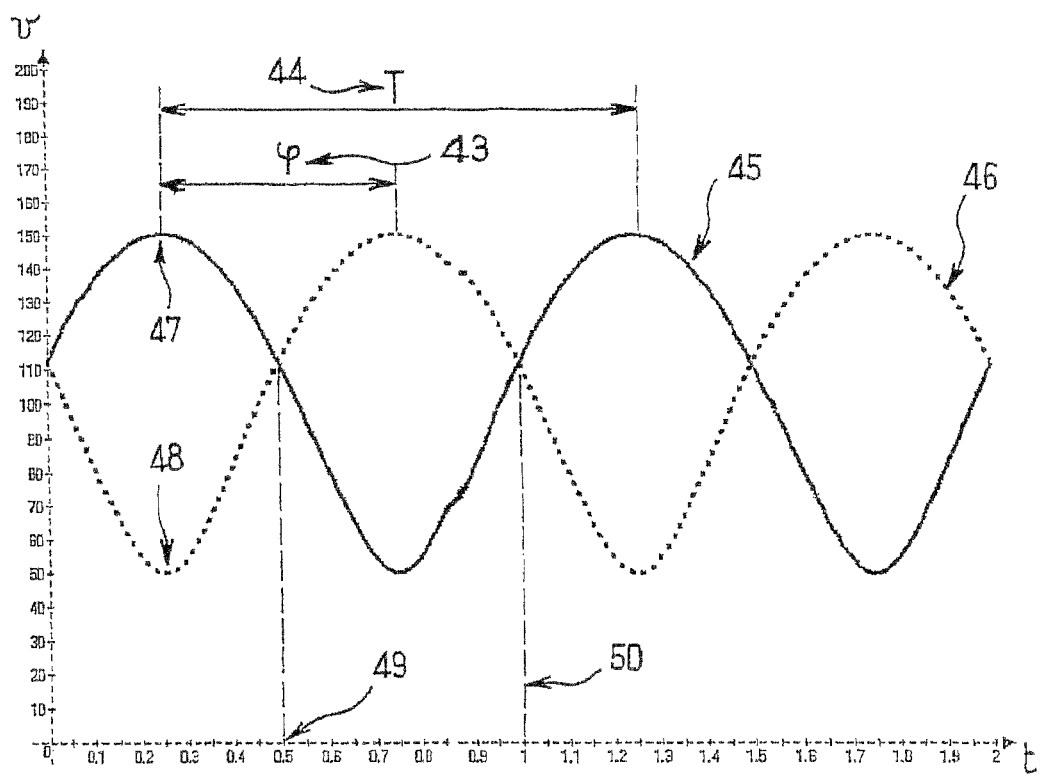
FIG_1
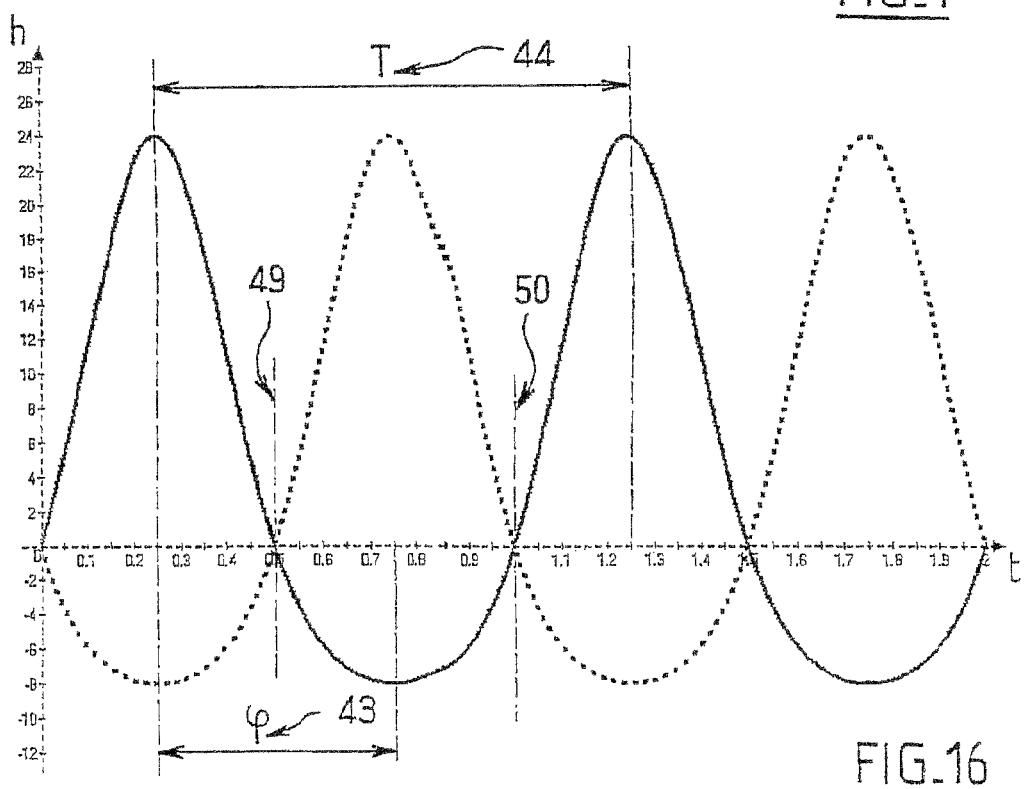
FIG_16

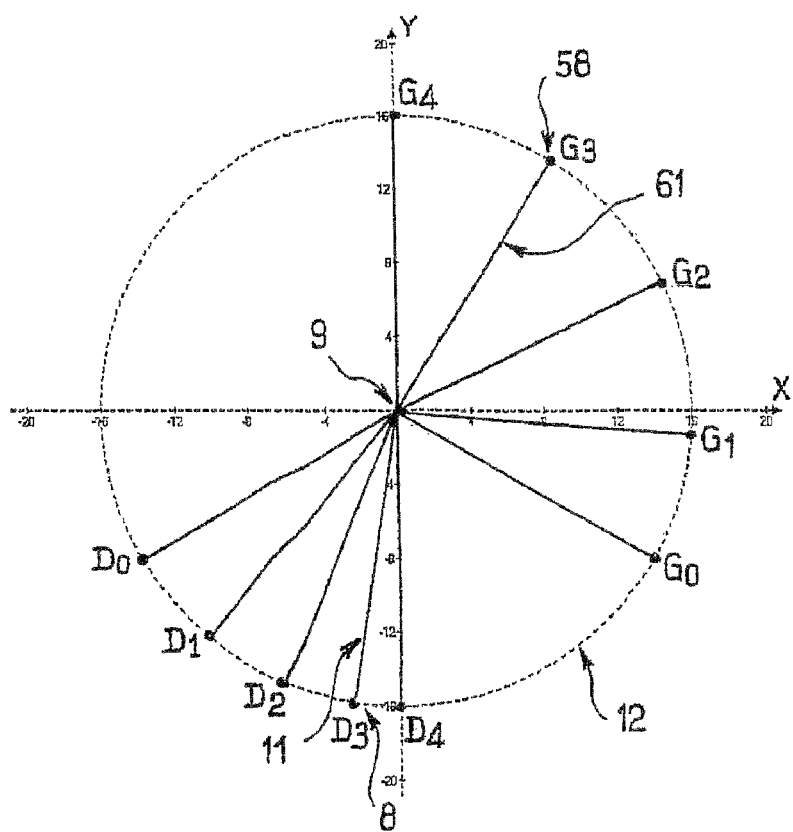
FIG_2
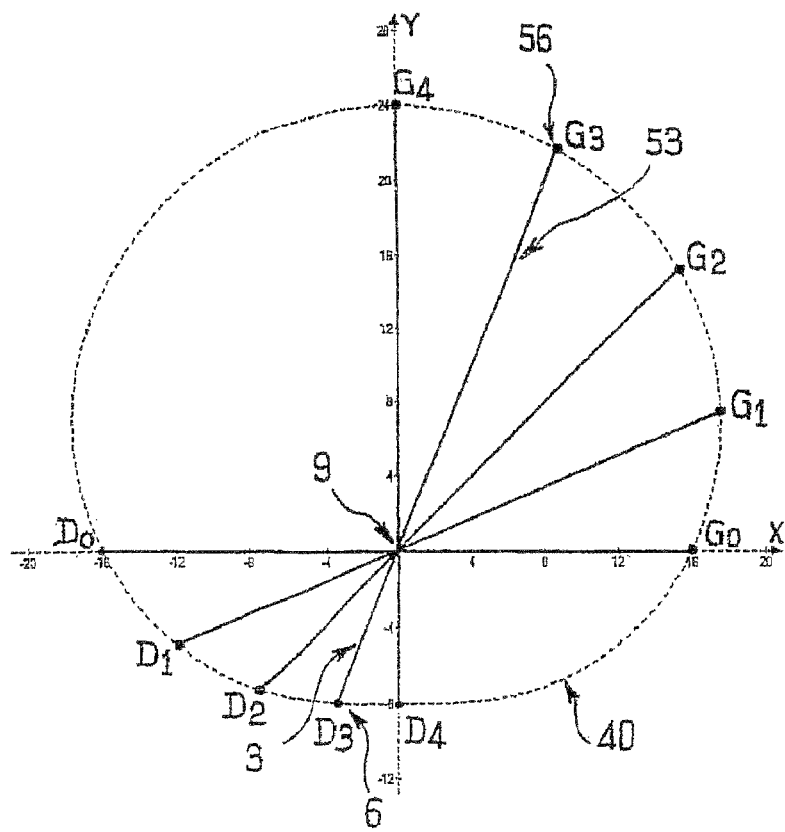
FIG_3

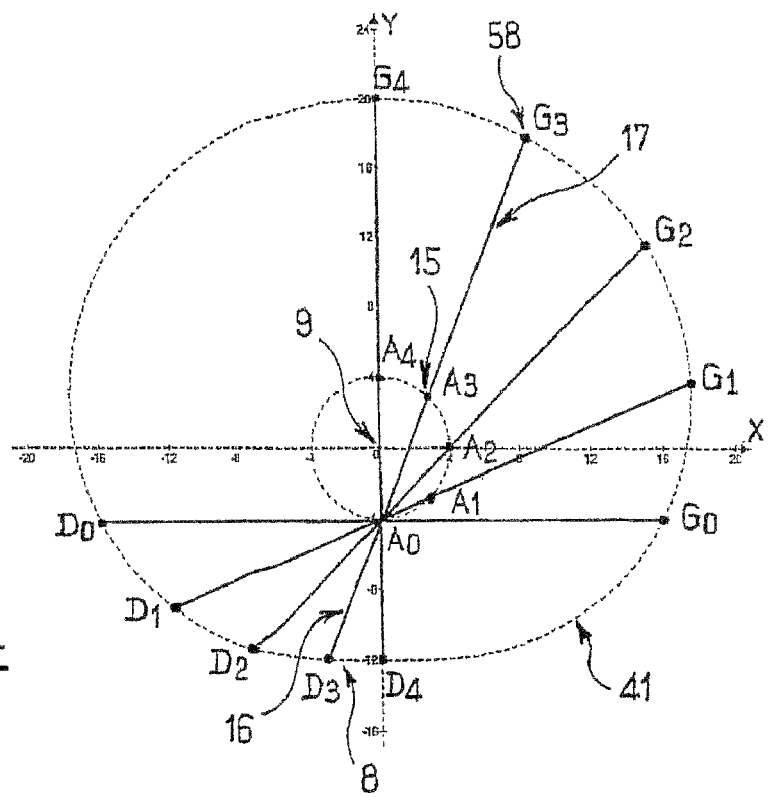
FIG_4
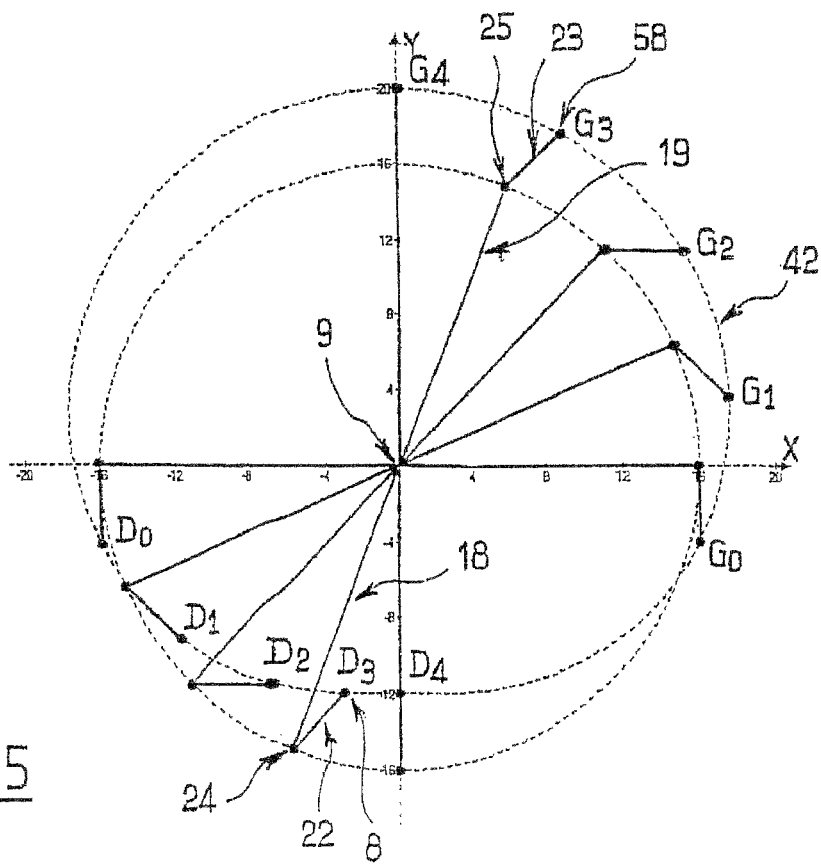
FIG_5

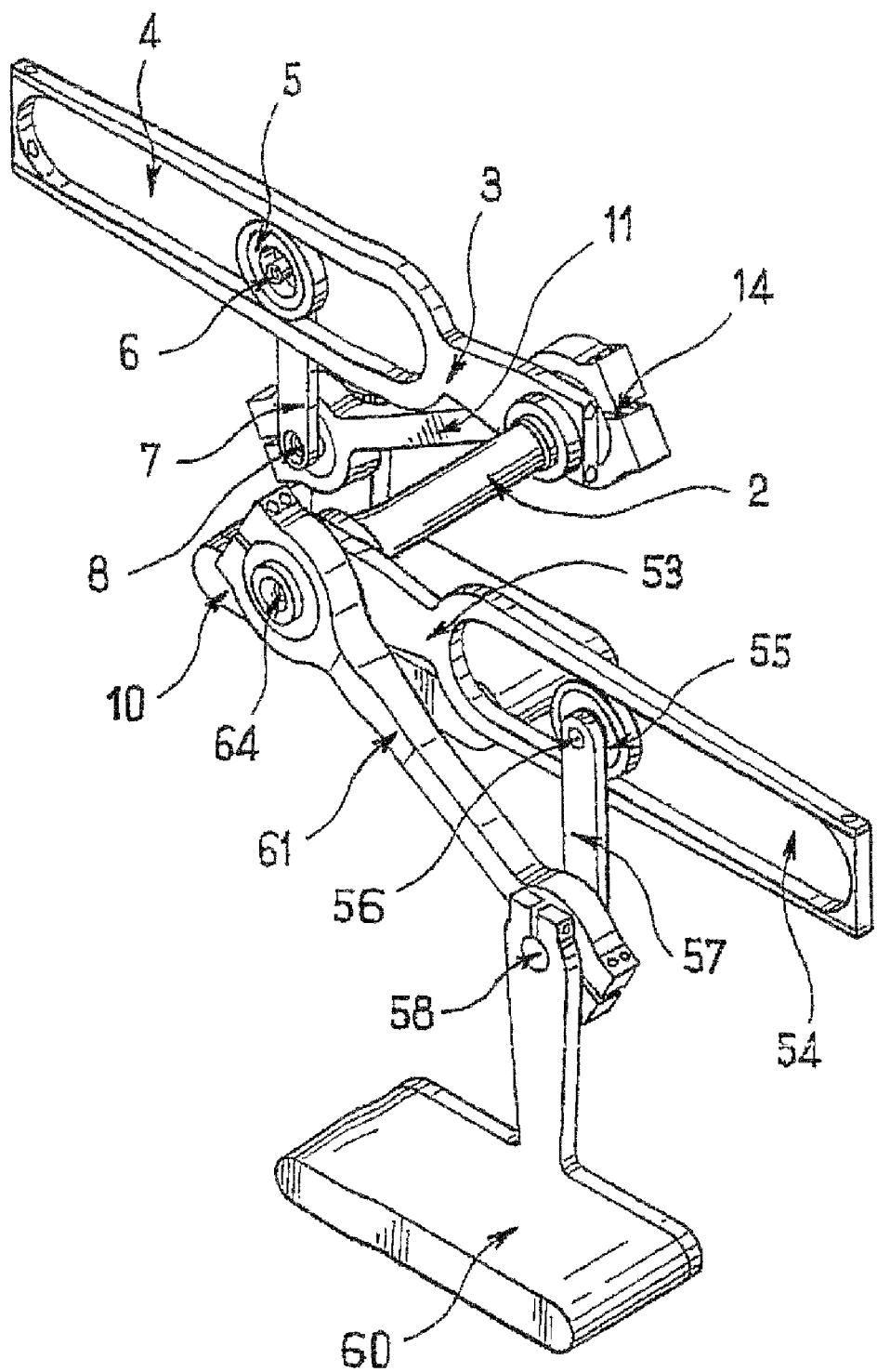
FIG_6

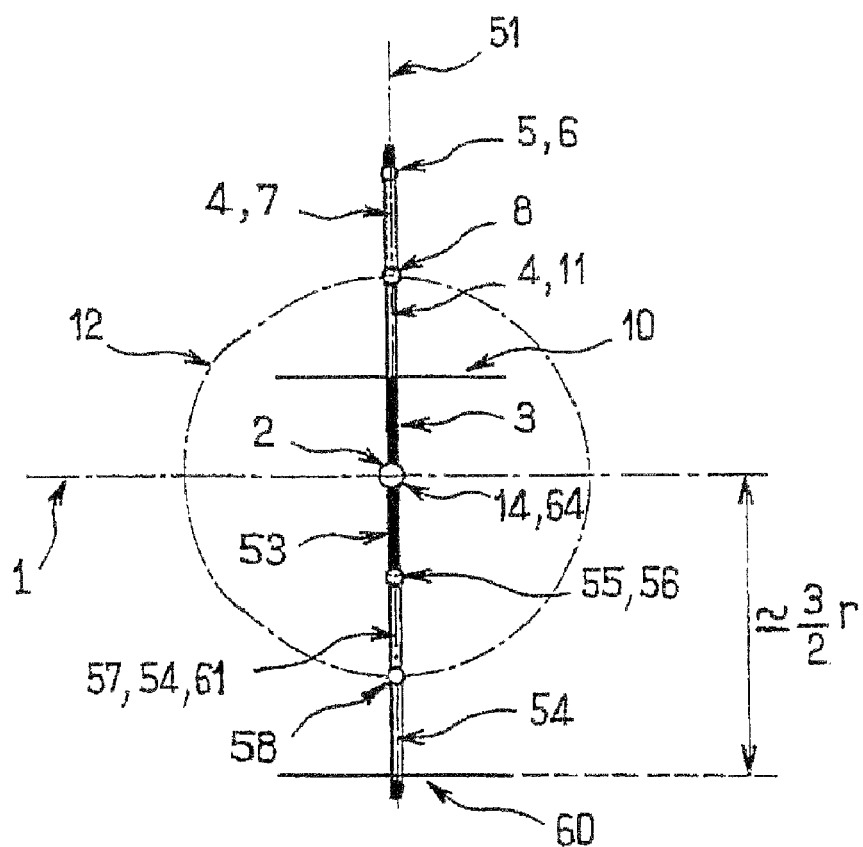
FIG_7
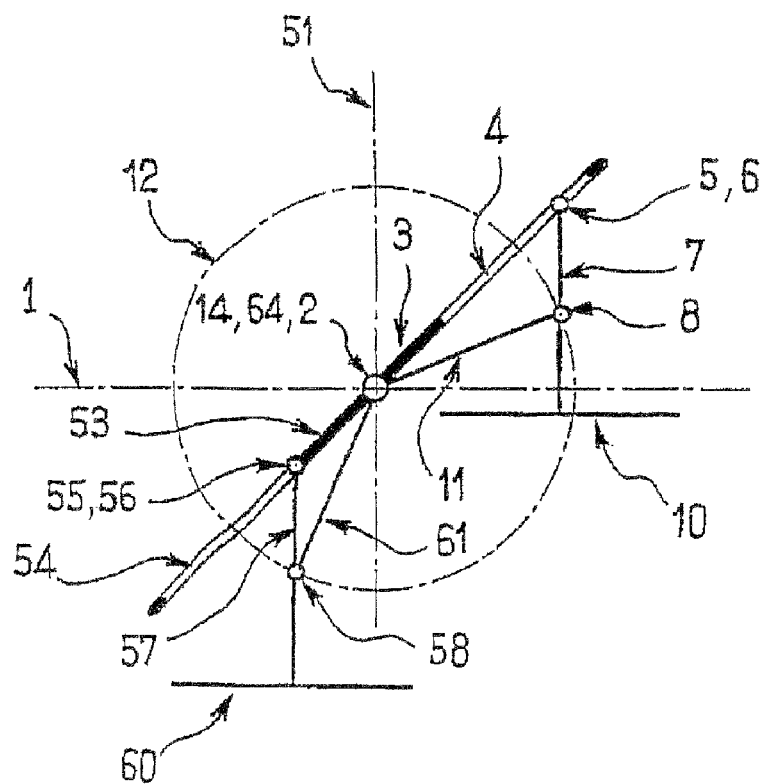
FIG_8

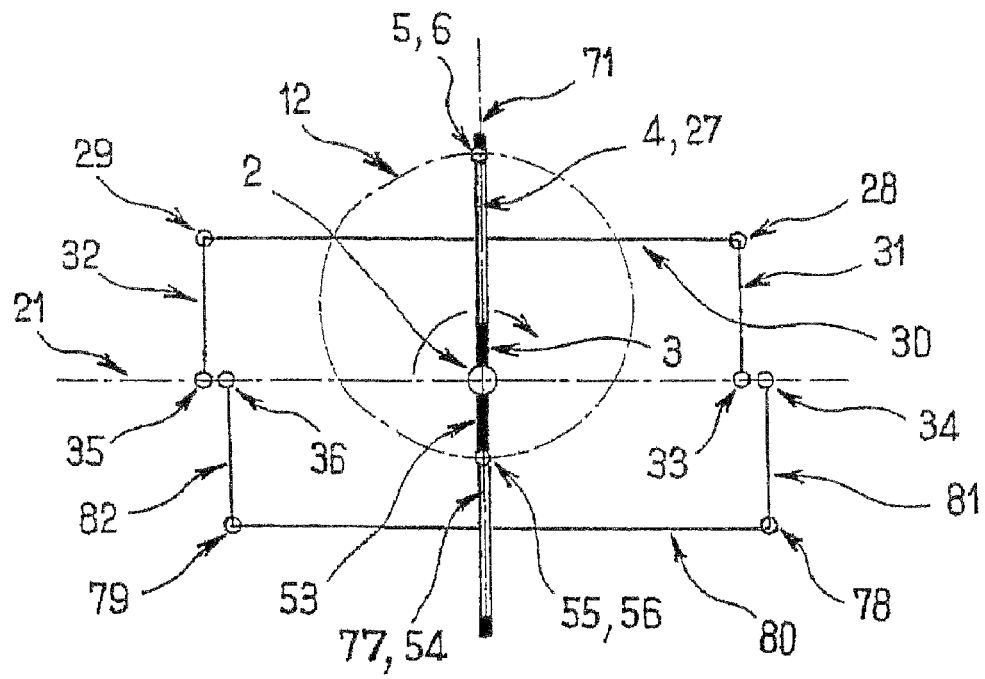
FIG_11
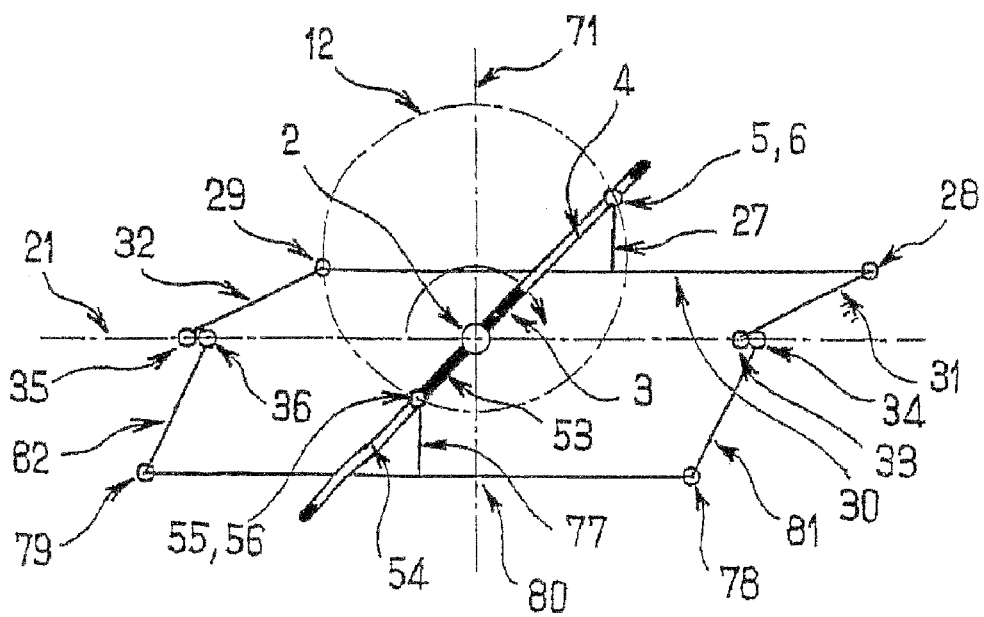
FIG_12

METHOD AND DEVICE FOR PEDALLING

TECHNICAL FIELD

The present invention relates to a pedalling method in particular suited to a standing position of a user. It also relates to a pedalling device or pedal assembly implementing this method.

Such a device allows a user to pedal while recreating natural movements similar to walking or running. The field of the invention is more particularly that of wheeled vehicles powered by pressure from the feet of a user, or that of static sports training devices. In the remainder of this document the word "cycle" will be used to designate any wheeled vehicle powered by the pressure from the feet of a user, or any static sports training apparatus.

STATE OF THE ART

In standing position, at a low or moderate rate of pedalling (thirty to sixty revolutions per minute), a user can develop a greater driving torque on a pedal assembly than in sitting position. Moreover, the standing position is more natural for a human being for moving than the sitting position: the standing position in fact avoids problems such as backache or neckache. Finally, a pedal assembly suited to the permanent standing position of a user allows a cycle to be produced which is particularly well suited to urban use, with no saddle, lightweight and with very compact dimensions.

However, such a cycle cannot comprise just any type of pedal assembly. A standard pedal assembly comprises a drive shaft mounted on bearings and on which a left crank and a right crank are rigidly fixed, perpendicular to the drive shaft. Each crank comprises at its free end a pedal turning about an axis which is perpendicular to the crank and parallel to the drive shaft. The movement of the pedal axis is a circle, centred on the drive shaft, and the angle between the two cranks has a fixed value of one hundred and eighty degrees. Such a pedal assembly is not suited to a permanent standing position of a user: for this type of pedal assembly, the efficiency of pedalling, i.e. the ratio of the driving power delivered to the pedal assembly to the power consumed by the muscles of the user, is much smaller for a standing position than for a sitting position of the user. In the following, the lowest position of a pedal will be called the lower dead centre of a pedal, and the highest position of a pedal the upper dead centre.

Starting from the principle that the circular rotary movement is the cause of the poor efficiency of a standard pedal assembly with a standing user, inventors have mainly proposed two types of solutions:
- devices where the feet of a standing user pedal according to an alternating piston movement, as disclosed in the documents US 20020163159A1 entitled "Foot pump scooter" and WO 0230732A1 entitled "Step bike", and
- devices where the feet of a standing user pedal according to a vertically flattened circle, the form of the circle then approximating an ellipse the large axis of which is horizontal, as disclosed in the document US 20030030245A1 entitled "Step-cycle for exercise, recreation, and transport having telescopically movable pedals".

The purpose of the present invention is to propose a pedalling method or device suited to a permanent standing position of a user, and allowing a fluid and natural movement of the user, said movement being similar to that of walking or running.

DISCLOSURE OF THE INVENTION

This objective is achieved with a pedalling method for causing a drive shaft to rotate by means of two pedals operated with a time delay between them along respective closed curved trajectories having a top part and a bottom part on either side of a plane where the pedals are at equal height, characterized in that, the movement of the pedals is, transmitted to the shaft by means of a transmission mechanism which defines for each pedal a higher average speed in the top part than in the bottom part, such that the plane of equal height of the pedals is below the mid-height of the closed trajectories.

The height of each pedal is defined along a vertical axis, perpendicular to a horizontal axis. Throughout the remainder of this document, it is understood that the vertical axis is not necessarily parallel to the force of gravity:
  if for example the orientation of each pedal (i.e. the orientation of the plane along which a user's foot rests on the pedal) is defined by the weight of a user, this vertical axis can be parallel to the force of gravity,
  if for example the orientation of each pedal is defined by a force exerted by a user, this vertical axis can be parallel to the force, and
  if for example the orientation of the pedals is maintained fixed relative to a frame, this vertical axis can be perpendicular to the ground on which this frame rests, regardless of the inclination, of the ground relative to the force of gravity.

The closed curved trajectories can have approximately equal horizontal and vertical dimensions.

For a constant speed of rotation of the drive shaft about its axis, the speeds of the pedals can be periodic with a period that is approximately equal to the double of the time delay between the pedals.

For a constant speed of rotation of the drive shaft about its axis, the speed of each pedal can be at its maximum in the top part and at its minimum in the bottom part, and the ratio of the maximum speed to the minimum speed of each pedal can be essentially comprised between two and three.

For a constant speed of rotation of the drive shaft about its axis, the speed of each pedal can be approximately at its maximum in the highest position of its trajectory and approximately at its minimum in the lowest position of its trajectory.

The speeds of the pedals can be approximately equal when they are in the plane of equal height.

The method according to the invention can also comprise a use by a user in standing position on the pedals.

The method according to the invention makes it possible, compared to a method according to the prior art, to reduce the oscillation amplitude of the centre of gravity of a user pedalling on the pedals in standing position, and thus makes it possible to increase the user's pedalling efficiency in this position.

According to yet another feature of the invention, a pedalling device is proposed implementing the method according to the invention, comprising:
  coupling means for coupling a rotation of a drive shaft about its axis to the time-shifted movements of a right pedal and a left pedal, and
  guide means for limiting the movement of each pedal to a closed curved trajectory having a top part and a bottom part an either side of a plane where the pedals are at equal height,
  characterized in that the coupling means and the guide means form part of a transmission mechanism which defines for each pedals a greater average speed in the top part than in the bottom part, such that the plane of equal height of the pedals is below the mid-height of the closed trajectories.

The transmission mechanism can be suitable for substantially equalizing the speeds of the pedals when they are in the plane of equal height.

According to a first group of device embodiments according to the invention, the drive shaft can pass through a frame and the transmission, mechanism can comprise for each pedal:
- a guide crank articulated to the frame and not integral with the drive shaft, and
- a pedal pivot connecting the pedal to the guide crank.

According to a second group of device embodiments according to the invention, the transmission mechanism can comprise for each pedal:
- a driving crank, integral with the drive shaft,
- a transmission pivot connecting the pedal to the driving crank, and
- means for varying the distance between the axis of said transmission pivot and the axis of the drive shaft during the rotation of the shaft.

According to a first embodiment of this second group, the drive shaft can pass through a frame and the transmission mechanism can also comprise for each pedal:
- a guide crank, articulated to the frame and not integral with the drive shaft,
- a pedal pivot connecting the pedal to the guide crank, and
- a connecting rod carrying the pedal pivot and the transmission pivot.

For this first embodiment:
the pedal can be integral with the connecting rod,
each guide crank can be articulated to the frame by a frame pivot approximately coaxial with the drive shaft. For each pedal the distance between the axis of the pedal pivot and the axis of the transmission pivot can be approximately equal to half the distance between the axis of the frame pivot and the axis of the pedal pivot.

According to a second embodiment of this second group, the drive shaft can pass through a frame and the transmission mechanism can also comprise for each pedal:
- two guide cranks, each articulated to the frame by a frame pivot and not integral with the drive shaft,
- two pedal pivots each connecting the pedal to one of the two guide cranks, and
- a connecting rod carrying the transmission pivot and integral with the pedal.

For this second embodiment, the pedalling device according to the invention can also comprise means for stabilizing the guide cranks, preferably a parallelogram or a deformable quadrilateral.

For this first or second embodiment:
for each pedal the minimum distance between the axis of the transmission pivot and the axis of the drive shaft can be approximately equal to half the distance between the axis of the frame pivot and the axis of the pedal pivot connected by one of the guide cranks, and
for each pedal the maximum distance between the axis of the transmission pivot and the axis of the drive shaft can be approximately equal to 1.5 times the distance between the axis of the frame pivot and the axis of the pedal pivot connected by one of the guide cranks.

For this second group of device embodiments according to the invention, the means for varying distance can comprise for each pedal:
- a groove along the driving crank, and
- a roller which is free to move by rolling in the groove, and connected to the transmission pivot.

For each pedal, the groove can be substantially wider than the diameter of the roller, such that the roller is free to move in the length of the groove by rolling on just one face of the groove at a time.

Still for this second embodiment group, the means for varying the distance can comprise means for varying the effective length of the driving cranks, such as a slide.

According to a third group of device embodiments according to the invention, the transmission mechanism can comprise:
- a secondary shaft having an axis substantially parallel to the drive shaft,
- means of coupling a rotation of the drive shaft about its axis to a rotation of the axis or the secondary shaft about the axis of the drive shaft and to a rotation of the secondary shaft about its axis, and for each pedal:
- a secondary crank, integral with the secondary shaft, and
- a pedal pivot connecting the pedal to the secondary crank.

For this third embodiment group:
the coupling means can be arranged such that the axis of the secondary shaft rotates freely about the axis of the drive shaft at an angular speed approximately equal the double of the angular speed of rotation of the secondary shaft about its axis, and
the secondary cranks can be approximately four times longer than the radius of rotation of the axis of the secondary shaft about the axis of the drive shaft.

According to a fourth group of device embodiments according to the invention, the transmission mechanism can comprise for each pedal:
- a first crank, integral with the drive shaft,
- a second crank connected to the first crank by a secondary pivot, and
- a pedal pivot connecting the pedal to the second crank.

For this fourth embodiment group, and for each pedal,
the drive shaft and the first and second cranks can be coupled such that the second crank rotates freely about the axis of the secondary pivot at an angular speed approximately equal to the double of the angular speed of rotation of the axis of the secondary pivot about the axis of the drive shaft, and
the first crank can be approximately four times longer than the second crank.

A pedalling device according to the invention can also comprise means for transmitting a driving power from the drive shaft to a device consuming this power.

A pedalling device according to the invention can be integrated into a vehicle or a static sports training apparatus.

DESCRIPTION OF FIGURES AND EMBODIMENTS

Figure 15:
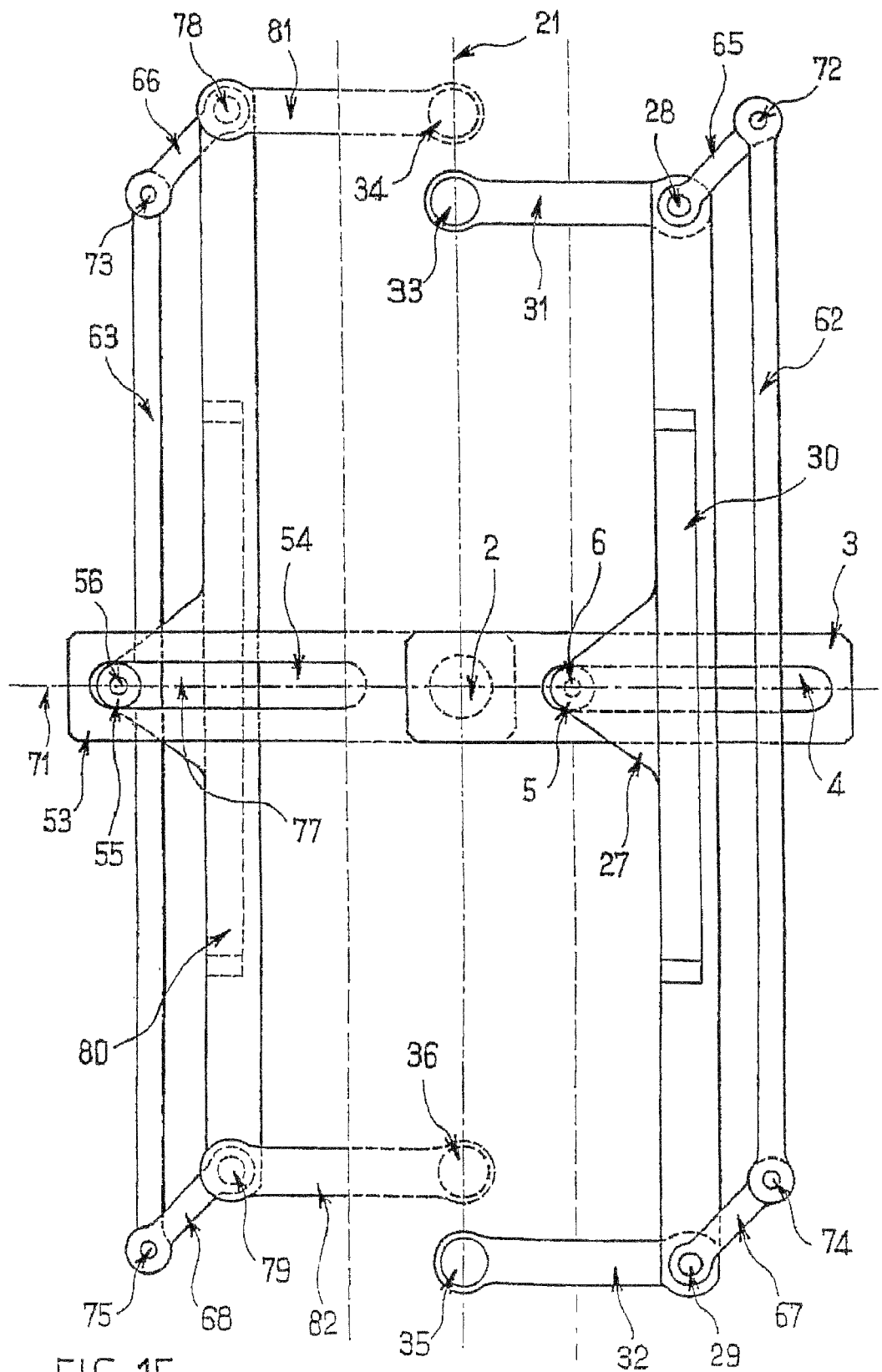

Other advantages and characteristics of the invention will become apparent on examination of the detailed description of implementations which are in no way limitative, and the attached diagrams, in which:

FIG. 1 illustrates how the speed of a right pedal and left pedal of a device according to the invention develops over time, the device also comprising a drive shaft and in the particular case where the angular speed of rotation of this shaft about its axis is constant, FIG. 2 is a diagrammatic side view of a first group of embodiments of a device according to the invention, FIG. 3 is a diagrammatic side view of a second group of embodiments of a device according to the invention, FIG. 4 is a diagrammatic side view of a third group of embodiments of a device according to the invention, FIG. 5 is a diagrammatic side view of a fourth group of embodiments of a device according to the invention, FIG. 6 is an overall view of a first embodiment of a device according to the invention, FIGS. 7, 8, 9 and 10 illustrate diagrammatic side views of four successive states of the first embodiment of device according to the invention, FIGS. 11, 12, 13 and 14 illustrate diagrammatic side views of four successive states of a second embodiment of a device according to the invention, FIG. 15 illustrates a side view of the second embodiment of a device according to the invention, and FIG. 16 illustrates how the height of a right pedal and left pedal of a device according to the invention develops over time, the device also comprising a drive shaft, and in the particular case where the angular speed of rotation of this shaft about its axis is constant.

When a user in the standing position is observed pedalling on a standard pedal assembly, a significant vertical oscillation of its centre of gravity is noted the vertical position of the centre of gravity no longer being maintained substantially fixed by a fixed point such as a saddle. The user thus wastes energy, said energy being dissipated when a pedal reaches a lower dead centre. The pedalling efficiency is therefore low. If the user tries to reduce the amplitude of the oscillation of his centre of gravity, he must deliver a static effort, quite particularly at his quadriceps, and this effort produces no driving power. The pedalling efficiency is therefore also low.

The description of the figures will in particular make it possible to explain how the oscillation of the centre of gravity of a user standing on a device according to the invention is reduced relative to the oscillation of this same user on a standard pedal assembly, which allows said user of a pedal assembly according to the invention to have a fluid and natural movements similar to that of walking or running, as well as a good pedalling efficiency relative to the pedalling devices according to the prior art.

A pedalling device according to the invention generally comprises:

coupling means for coupling a rotation of a drive shaft about its axis to the time-shifted movements of a right pedal and left pedal, and guide means for limiting the movement of each pedal to a closed curved trajectory having a top part and a bottom part on either side of a plane where the pedals are at an equal height, and is characterized in that the coupling means and the guide means form part of a transmission mechanism which defines for each pedal a greater average speed in the top part than in the bottom part, such that the plane of equal height of the pedals is below the mid-height of the closed trajectories.

A description will be given firstly, with reference to FIGS. 1 and 16, of how the speed v and the height h of the right pedal and left pedal of a device according to the invention develop in relation to time t, in the particular case where the angular speed of rotation of the drive shaft about its axis is constant. For the example illustrated in FIG. 1, the unit of speed on the ordinate axis is centimeters per second, the unit of time on the abscisse axis is the second, and the drive shaft turns at a constant speed of one revolution per second. For the example illustrated in FIG. 16, the unit of height on the ordinate axis is the centimeter, the unit of time on the abscisse axis is the second, and the drive shaft turns at a constant speed of one revolution per second. The pedals and the drive shaft are arranged so as to cause a drive shaft to rotate by means of two pedals operated with a time delay φ 43 between them, along respective closed curved trajectories having a top part and a bottom part on either side of a plane where the pedals are at an equal height, by transmitting the movement of the pedals to the shaft via a transmission mechanism which defines for each pedal a greater average speed in the top part than in the bottom part, such that the plane of equal height of the pedals is below the mid-height of the closed trajectories. For a constant speed of rotation of the drive shaft about its axis, the development of the speeds of the pedals is periodic, the speed 45 of the right pedal and the speed 46 of the left pedal having a period T 44 approximately equal to the double of the time delay 43. In FIG. 16, the height of the plane of equal height of the pedals has been set as the height zero point (h=0). It is noted in this figure that the highest position of each pedal is further from the plane of equal height than the lowest position of each pedal; in other words, the plane of equal height of the pedals is situated below the mid-height of the trajectories of the pedals.

FIGS. 1 and 16 correspond to the preferential case where the speed of each pedal passes through a maximum 47 at the highest position of its trajectory and through a minimum 48 at the lowest position of its trajectory, and also where the maximum 47 of the speed of one pedal occurs at the same moment as the minimum 48 of the speed of the other pedal: in other words, when a pedal reaches its upper dead centre, the other pedal reaches its lower dead centre. During a period 44, the pedals are simultaneously at positions of equal height at two moments of equalization 49, 50, corresponding to the fall then to the rise of the pedals. It is noted in FIG. 1 that the ratio of the maximum 47 to the minimum 48 speed is of the order of three. Several embodiments make it possible to obtain a pedalling device implementing this method.

A description will be given, with reference to FIGS. 2 to 5, of diagrammatic side views of the left side (therefore the direction of rotation of the drive axis is anti-clockwise) of four families of embodiments of a device according to the invention. These embodiments comprise a right pedal, a left pedal, and a drive shaft rotating freely about its axis 9. In these figures a horizontal axis X and a vertical axis Y (graduated in an arbitrary unit of length) are represented, as well as five successive positions $D_0, D_1, D_2, D_3$ and $D_4$ of the right pedal and five successive positions $G_0, G_1, G_2, G_3$ and $G_4$ of the left pedal. The positions with the same index are simultaneous. For a constant speed of rotation of the drive shaft about its axis 9, positions of successive indices are temporally spaced apart by one sixteenth of the period of the movement of the pedals.

Each embodiment of the first group illustrated in FIG. 2 comprises a right guide crank 11 and a left guide crank 61. The drive shaft passes through a frame. The guide cranks are not integral with each other and with the drive shaft, and are articulated to the frame, for example by a pivot having an axis parallel to that of the drive shaft. Each embodiment also comprises a right 8 or left 58 pedal pivot respectively connecting the respective right or left pedal to the respective right or left guide crank. In this group, the pedals describe a circle as curve 12. The guide cranks and the drive shaft can for example be coupled by a set of non-circular gears, or by a set of chains and non-circular sprocket wheels.

Each embodiment of the second group illustrated in FIG. 3 comprises a right 3 and left 53 driving crank, integral with the drive shaft, forming between them an angle of one hundred and eighty degrees, and of variable effective length. Each embodiment also comprises a right 6 or left 56 transmission pivot respectively connecting the respective right or left;

pedal to the respective right or left driving crank. For this group, the pedals do not necessarily describe a circle as curve 40.

Each embodiment of the third group illustrated in FIG. 4 comprises a secondary shaft having an axis 15 substantially parallel to the drive shaft, and means for coupling a rotation of the drive shaft about its axis 9 to a rotation of the axis 15 of the secondary shaft about the axis 9 of the drive shaft and to a rotation of the secondary shaft about its axis 15. Each embodiment also comprises a right 16 and left 17 secondary crank, integral with the secondary shaft, forming between them an angle of one hundred and eighty degrees, as well as a respectively right 8 or left 58 pedal pivot connecting the respectively right or left pedal to the respectively right or left secondary crank. If:

the coupling means are arranged such that the axis 15 of the secondary shaft rotates freely about the axis 9 of the drive shaft at an angular speed substantially equal to the double of the angular speed of rotation of the secondary shaft about its axis 15, and the right 16 and left 17 secondary cranks are approximately four times longer than the radius of rotation of the axis 15 of the secondary shaft about the axis 9 of the drive shaft, then the embodiments of this group implement a method according to the invention. For this group, the pedals do not necessarily describe a circle as curve 41.

Each embodiment of the fourth group illustrated in FIG. 5 comprises a first right 18 and left 19 crank, integral with the drive shaft, and forming between them an angle of one hundred and eighty degrees. Each embodiment also comprises a respectively right 22 or left 23 second crank connected to the first respectively right or left crank by a respectively right 24 or left 25 secondary pivot, as well as a respectively right 8 or left 58 pedal pivot connecting the respectively right or left pedal to the respectively right or left second crank. If:

the drive shaft and the first 18, 19 and second 22, 23 cranks are coupled such that the respectively right 22 or left 23 second crank rotates freely about the axis of the respectively right 24 or left 25 secondary pivot at an angular speed approximately equal to the double of the angular speed of rotation of the axis of the respectively right 24 or left 25 secondary pivot about the axis 9 of the drive shaft, and the respectively right 18 or left 19 first crank is substantially four times longer than the respectively right 22 or left 23 second crank, then the embodiments of this group implement a method according to the invention. For this group, the pedals do not necessarily describe a circle as curve 42.

A description will now be given, with reference to FIGS. 6, 7, 8, 9 and 10, of a first embodiment of a pedalling device (or pedal assembly) according to the invention. This first embodiment belongs both to the first and to the second embodiment group described previously. FIG. 6 illustrates a general view of the first embodiment of a pedalling device according to the invention. FIGS. 7, 8, 9 and 10 illustrate diagrammatic side views of four successive states of this same device in rotation. In this first embodiment, the pedalling device comprises a drive shaft 2 substantially perpendicular to the plane formed by a horizontal axis 1 and a vertical axis 51. These axes are not shown in FIG. 1. This is the case where the vertical axis is defined substantially parallel to the force of gravity. The vertical axis acts as a base for a height scale defining the height of any object such as a pedal for example. The drive shaft passes through a frame and is free to turn about its axis relative to the frame. The drive shaft 2 is integral with a piece such as a crown wheel or smooth ring, not represented in these figures, located inside or outside the frame and making it possible to transmit via a chain, a belt or a shaft, a driving power generated by a rotation of the drive shaft 2 to any device consuming this power such as a rear wheel, or an energy dissipating system of a static sports training device. The drive shaft is integral, on the right of the plane formed by the axes 1 and 51 with a right driving crank 3, and on the left of this plane with a left driving crank 53. The two driving cranks are substantially perpendicular to the drive shaft, and form between them an angle substantially equal to one hundred and eighty degrees. Thus, a rotation of the drive shaft is integral with rotations of the driving cranks. The respectively right 3 or left 53 driving crank is connected to a respectively right 7 or left 57 connecting rod via a respectively right 6 or left 56 transmission pivot with an axis substantially parallel to the drive shaft. The respectively right or left transmission pivot is integral with the respectively right or left connecting rod substantially perpendicular to the drive shaft. The respectively right or left connecting rod is integral with the axis of a respectively right 8 or left 58 pedal pivot, itself integral with a respectively right 10 or left 60 pedal. The axis of the pedal pivots is substantially parallel to the drive shaft. A respectively right 11 or left 61 guide crank is free to turn about a respectively right 14 or left 64 frame pivot, here coaxial with the drive shaft 2, and about the axis of the respectively right 8 or left 58 pedal pivot. Each guide crank is therefore articulated to the frame via the drive shaft which acts as an axle for the frame pivots. This first embodiment also comprises respectively right 4, 5, or left 54, 55 means for varying the distance between the respectively right 6 or left 56 transmission pivot and the axis of the drive shaft 2. These means of varying the distance include a respectively right 4 or left 54 longitudinal groove in which a respectively right 5 or left 55 roller rolls. This longitudinal groove is very slightly wider than the diameter of the roller, such that the roller alternately rests on each of the two faces of the longitudinal groove without rubbing against the other face. The roller possesses a bearing strip whose surface can be convex or concave, and in this case the two faces of the longitudinal groove have a form complementary to that of the roller such that the contact surface between one of the two faces of the longitudinal groove and the roller is always a curved line of convex or concave form and thus the roller cannot leave the longitudinal groove. The respectively right 5 or left 55 roller turns about the axis of the respectively right 6 or left 56 transmission pivot. The roller and the axis of the transmission pivot can be connected via a ball joint (not shown) which allows them to turn relative to one another even in the case where the axis of the transmission pivot is not wholly perpendicular to the driving crank.

The role of the driving cranks is to transmit driving forces to the drive shaft. The role of the guide cranks is to guide the pedals in a circular movement and therefore to sustain all the forces other than the driving torques. The role of the connecting rods is to couple the driving and guide cranks, and to transmit the driving forces to the driving cranks. The role of the longitudinal grooves is to vary the distance between the axes of the transmission pivots and of the drive shaft.

Preferably:

for each pedal the distance between the axis of the pedal pivot 8 or 58 and the axis of the transmission pivot 6 or 56 is approximately equal to half the distance between the axis of the frame pivot 4 or 64 and the axis of the pedal pivot 8 or 58, for each pedal the minimum distance between the axis of the transmission pivot 6 or 56 and the axis of the drive shaft 2 is approximately equal to half the distance between the axis of the frame pivot 4 or 64 and the axis of the pedal pivot 8 or 58, and for each pedal the maximum distance between the axis of the transmission pivot 6 or 56 and the axis of the drive shaft 2 is approximately equal to 1.5 times the distance between the axis of the frame pivot 4 or 64 and the axis of the pedal pivot 8 or 58.

The four successive states of the pedal assembly shown in FIGS. 7, then 8, then 9 and finally 10 follow one another when the drive shaft 2 makes a quarter-turn clockwise between each figure. There are thus two, and only two, diametrically opposite positions for which the right and left driving cranks are aligned with the guide cranks. One of these positions is illustrated in FIG. 7. As the pivots, the cranks, and the grooves are aligned in this figure, it is therefore difficult to distinguish all these elements.

The advantage of a circular pedals movement is that it is suited to producing a good mechanical power and that it is simple from a mechanical point of view. During the rotation of the drive shaft, the right pedal and the left pedal describe the same circle (shown in FIGS. 7, 8, 9, and 10 exclusively) as a curve 12. A straight line connecting the axis of the respectively right 8 or left 58 pedal pivot to the centre of the circle, situated on the drive shaft 2, is parallel to the respectively right 11 or left 61 guide crank. A position of the right pedal pivot on the circle 12 corresponds to a single position of the left pedal pivot on the circle 12. The angle between the right guide crank and the left guide crank varies during the movement of the pedals, and passes through a minimum a when the pedals are substantially at the same height, as illustrated in FIG. 9. The plane where the pedals are at an equal height is situated below the centre of the circular trajectory of the pedals. In order of magnitude, the minimum angle is preferably equal to 120°. The smaller the angle α, the further the pedalling device according to the invention is from a standard pedal assembly. Still in terms of the order of magnitude, it can be seen in FIG. 7 that, when the driving cranks are aligned with the horizontal axis 1, the distance between the horizontal axis 1 and the left pedal 60 is approximately equal to $$\frac{3}{2}r,$$

with r the radius of the circle 12. When the drive shaft makes a quarter-turn as illustrated in FIG. 9, the distance between the horizontal axis 1 and the left pedal 60 is equal to r. This makes it possible to estimate the oscillation amplitude of the centre of gravity of a user in permanent standing position with one leg straight on this first embodiment of a pedalling device according to the invention, of the order of $$\frac{3}{2}r - r = \frac{r}{2}.$$

In the case of a standard pedal assembly, similar reasoning makes it possible to estimate an oscillation amplitude equal to r. This first embodiment of a pedal assembly according to the invention therefore makes it possible to divide the oscillation amplitude of the centre of gravity of a user in standing position by a factor of two relative to a standard pedal assembly. Thus, the movement of the legs of the user is similar to that of walking or running. Indeed, when walking, the foot which is in contact with the ground moves less quickly, compared with the walker's centre of gravity, than the other foot. The angle α and therefore the division factor of the oscillation amplitude of the centre of gravity compared with a standard pedal assembly depends on the lengths of the connecting rods, the cranks, the pedals and also depends on where the pivots are placed. Passing from FIGS. 7, to 8, then 9 and finally 10, it is noted that:

the drive shaft 2 makes a quarter-turn clockwise between each figure, the right pedal 10 has an angular speed which decreases between each figure, the right pedal travelling from top to bottom in these four figures, and the left pedal 60 has an angular speed which increases between each figure, the left pedal travelling from bottom to top in these four figures.

Thus a first pedal situated higher than a second pedal has a greater speed than said second pedal. The speed of a pedal in a maximum height position is maximum, which limits the upper dead centre effect, and means that in this position the lever arm of this pedal relative to the drive shaft is also maximum. The speed of a pedal at a minimum height position is at its minimum, which limits a dissipation at the lower dead centre of kinetic energy associated with the movement of the centre of gravity of a user along the vertical axis 51, and means that in this position the lever arm of this pedal in relation to the drive shaft is also at its minimum.

The drive shaft 2 is free to turn relative to the frame. Therefore, whatever the orientation of the frame in the plane formed by the horizontal 1 and vertical 51 axes, it is the weight of the user which maintains the orientation of each pedal, whatever its position on its circular trajectory.

It is possible to imagine variations on this first embodiment. Thus, it would be possible to modify it by making the connecting rods non-integral with the pedals. The orientation of the respectively right or left connecting rod can then be maintained fixed relative to the orientation of the frame or of the respectively right or left pedal by an appropriate device, preferably two articulated rods forming a deformable parallelogram with the respectively right or left guide crank and a part of the frame.

A description will now be given with reference to FIGS. 11, 12, 13, 14 and 15 of a second embodiment of a device according to the invention. FIGS. 11, 12, 13 and 14 illustrate diagrammatic side views of four successive states of this device in rotation. FIG. 15 illustrates a side view of the second embodiment of a device according to the invention. This second embodiment belongs to both the first and second embodiment group described previously. In this second embodiment, the device comprises a drive shaft 2, a frame, a right 3 and left 53 driving crank, a right 4 and left 54 longitudinal groove, a right 5 and left 55 roller, and a right 6 and left 56 transmission pivot identical to the embodiment previously described. A first axis 21 defines the horizontal and a second axis 71 defines the vertical. For this embodiment, the horizontal is defined as the direction parallel to the pedals the orientation of which (i.e. the orientation of the plane along which a user's foot rests on the pedal) is maintained fixed relative to the frame, the vertical then not necessarily being parallel to the force of gravity. The axis of the respectively right 6 or left 56 transmission pivot is integral with a respectively right 27 or left 77 connecting rod substantially perpendicular to the drive shaft. The connecting rods 27 and 77 can be in the form of a triangle the base of which is oriented downwards. The respectively right or left connecting rod is integral with a respectively right 30 or left 80 pedal, and the respectively right 30 or left 80 pedal is free to turn about the axes of a first respectively right 28 or left 78 pedal pivot and about the axes of a second respectively right 29 or left 79 pedal pivot. The axes of the pedal pivots 28, 29, 78, 79 are substantially parallel to the drive shaft. A first respectively right 31 or left 81 guide crank is free to turn about a first respectively right 33 or left 34 frame pivot, and is integral with the axis of the first respectively right 28 or left 78 pedal pivot. A second respectively right 32 or left 82 guide crank is free to turn about a second respectively right 35 or left 36 frame pivot, and is integral with the axis of the second respectively right 29 or left 79 pedal pivot.

Irrespective of the orientation of the frame relative to the direction of the weight of a user, the pedals are maintained fixed relative to the orientation of the frame by the guide cranks.

The role of the driving cranks, guide cranks, connecting rods, and longitudinal grooves, are the same as in the first embodiment described previously.

The four successive states of the device represented in FIGS. 11, then 12, then 13 and finally 14 follow each other when the drive shaft 2 makes a quarter-turn clockwise between each figure. There are thus two, and only two, diametrically opposite positions for which the right and left driving cranks are parallel to the guide cranks. One of these positions is illustrated in FIG. 11.

Figure 13:
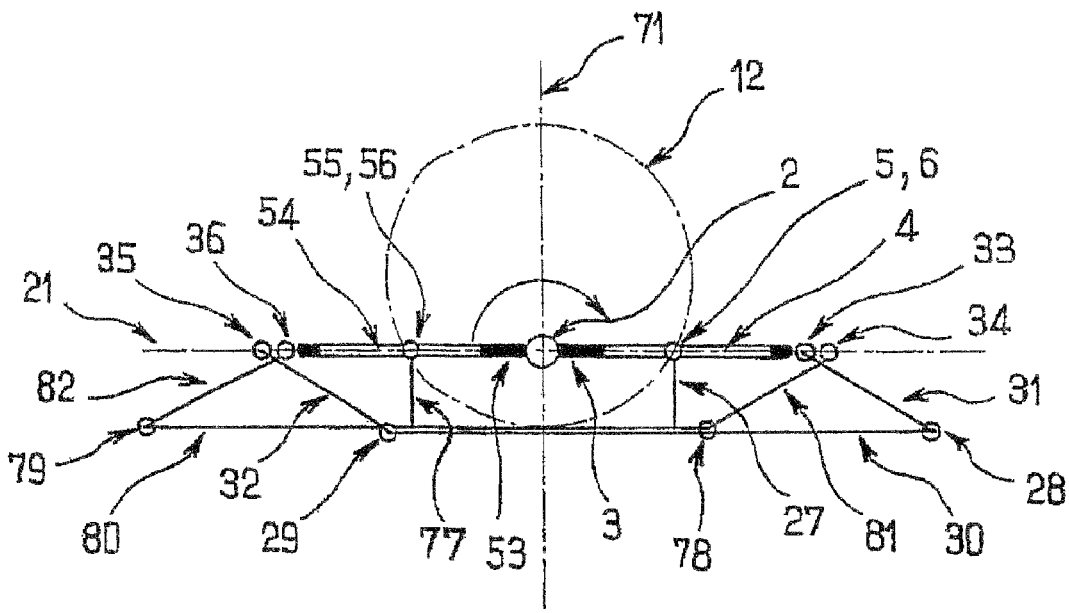
Figure 14:
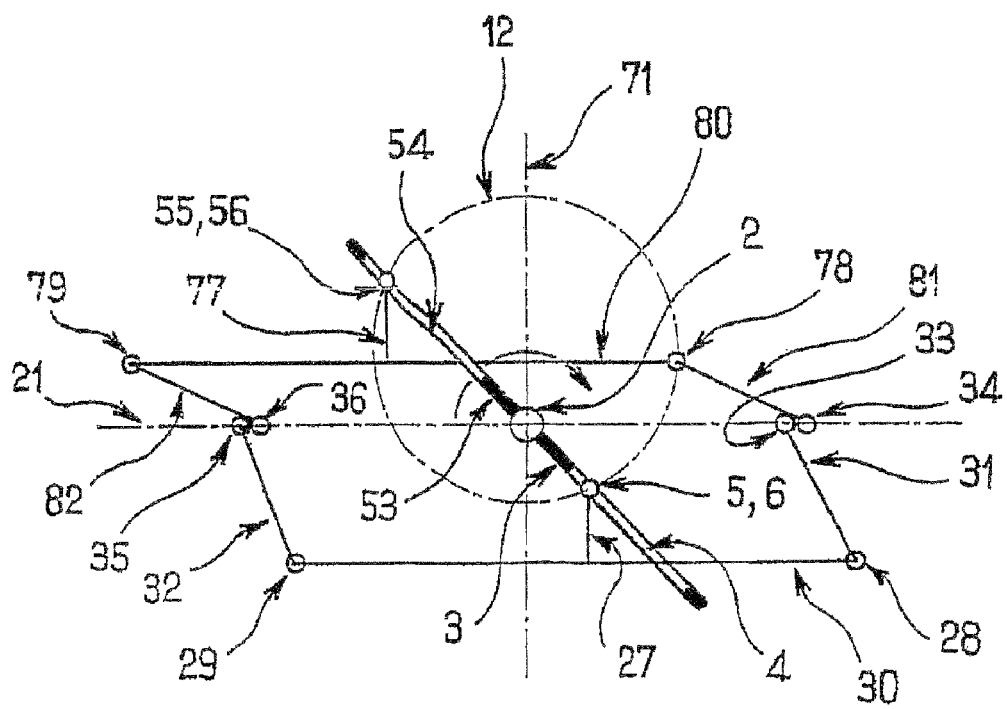

The frame pivots 33, 34, 35 and 36 are substantially aligned with the drive shaft along the horizontal axis 21. A height is defined for each pedal along the vertical axis 71. During the rotation of the drive shaft, the right pedal and the left pedal substantially describe such a circle as the same, curve 12. A position of the right transmission pivot on the circle 12 corresponds to a single position of the left transmission pivot on the circle 12. The angle between a segment connecting the right transmission pivot to the centre of the circle 12 and a segment connecting the left transmission pivot to the centre of the circle 12 varies during the movement of the pedals, and passes through a minimum when the pedals are substantially at the same height: this case is illustrated in FIG. 13. As in the first embodiment, this angle variation allows the reduction of the oscillation amplitude of the centre of gravity of a user in standing position on this second embodiment of a pedalling device according to the invention compared with a standard pedal assembly. Thus, the movement of the user's legs is similar to that when walking or running.

Passing from FIGS. 11, to 12, then 13 and finally 14, it is noted that:
- the drive shaft 2 makes a quarter-turn clockwise between each figure,
- the right pedal 30 has an angular speed which decreases between each figure, the right pedal travelling from top to bottom in these four figures, and
- the left pedal 80 has an angular speed which increases between each figure, the left pedal travelling from bottom to top in these four figures.

A first pedal situated higher than a second pedal has a greater speed than said second pedal. The speed of a pedal at a maximum height position is at its maximum, which limits the effect of the upper dead centre, and means that in this position the lever arm of this pedal compared with the drive shaft is also maximum. The speed of a pedal at a minimum height position is at its minimum, which limits a dissipation at the lower dead centre of kinetic energy associated with the movement of the centre of gravity of a user, and means that in this position the lever arm of this pedal in relation to the drive shaft is itself also at its minimum.

For the second embodiment, the deformable parallelogram constituted by the two right guide cranks 31 and 32, the two right frame pivots 33 and 35, the two right pedal pivots 28 and 29 and the right pedal 30 has unstable positions, like any deformable parallelogram, corresponding to the cases where the right frame pivots and the right pedal pivots are aligned. The same applies to the left side. FIG. 15 is more detailed than the diagrammatic FIGS. 11, 12, 13 and 14 in that it also shows means for stabilizing the guide cranks.

The means for stabilizing the guide cranks comprise a first and a second right stabilization connecting rod 65 and 67, a first and second right stabilization pivot 72 and 74, a right linking connecting rod 62, a first and a second left stabilization connecting rod 66 and 68, a first and a second left stabilization pivot 73 and 75, and a left linking connecting rod 63.

The first stabilization connecting rod respectively right 65 or left 66 is integral with the shaft of the first respectively right 28 or left 78 pedal pivot and is integral with a first respectively right 72 or left 73 stabilization pivot of which the axis is substantially parallel to the drive shaft 2. The respectively right 67 or left 68 second stabilization connecting rod is integral with the respectively right 29 or left 79 second pedal pivot and is integral with a respectively right 74 or left 75 second stabilization pivot of which the axis is substantially parallel to the drive shaft 2. The respectively right or left link connecting rod turns about the respectively right 72, 74 or left 73, 75 first and second stabilization pivots. Thus, the stabilization device forms two deformable parallelograms which stabilize all the guide cranks.

Of course, the invention is not limited to the examples which have just been described, and numerous adjustments can be made to these examples without exceeding the scope of the invention. In particular, numerous variations can be envisaged as to the manner of varying the distance between the axes of the transmission pivots and the drive shaft of a pedal assembly according to the invention. In the preceding description, the example was given of driving cranks which comprise a slide or a longitudinal groove inside which a transmission pivot slides. The case could also be envisaged where each driving crank is constituted of two pieces, one sliding in the other such that the effective length of these driving cranks varies, such that the distance between the axis of the transmission pivots and of the drive shaft varies. Finally, in the examples previously described, one pedal reaches its upper dead centre when the other pedal simultaneously reaches its lower dead centre. In other embodiments, the upper dead centre of a pedal may correspond substantially to the lower dead centre of the other pedal within give or take a few degrees, which has the effect of making it easy for a user to pass through these dead centres.

The invention claimed is:

1. A pedalling method for causing a drive shaft (2) to rotate by means of two pedals (10, 30, 60, 80) operated with a time delay (43) between them along respective closed curved trajectories (12, 40, 41, 42) having a top part and a bottom part on either side of a plane where the pedals are at equal height, comprising
    transmitting the movement of the pedals to the shaft by means of a transmission mechanism which defines for each pedal, upon the angular speed of rotation of the drive shaft about an axis of the drive shaft being constant, a higher average speed in the top part than in the bottom part, such that the plane of equal height of the pedals is below the mid-height of the closed trajectories,
    wherein the speeds (45, 46) of the pedals are approximately equal when they are in the plane of equal height.

2. The method according to claim 1, wherein the closed curved trajectories (12, 40, 41, 42) have approximately equal horizontal and vertical dimensions.

3. The method according to claim 1, wherein for a constant speed of rotation of the drive shaft (2) about the axis (9), the speeds (45, 46) of the pedals are periodic and have a period (44) approximately equal to the double of the time delay (43).

4. The method according to claim 1, wherein for a constant speed of rotation of the drive shaft (2) about the axis (9), the speed (45, 46) of each pedal is maximum at the top part and minimum at the bottom part, and in that the ratio of the maximum speed to the minimum speed of each pedal is a ratio between two and three.

5. The method according to claim 1, wherein for a constant speed of rotation of the drive shaft (2) about the axis (9), the speed of each pedal is substantially maximum at the highest position of a trajectory of each pedal and substantially minimum at the lowest position of the trajectory of each pedal.

6. The method according to claim 1, further comprises a use by a user in the standing position on the pedals.

7. A device implementing a method causing a drive shaft (2) to rotate by means of two pedals (10, 30, 60, 80) operated with a time delay (43) between them along respective closed curved trajectories (12, 40, 41, 42) having a top part and a bottom part on either side of a plane where the pedals are at equal height, by transmitting the movement of the pedals to the shaft by means of a transmission mechanism which defines for each pedal, upon the angular speed of rotation of the drive shaft about an axis of the drive shaft being constant, a higher average speed in the top part than in the bottom part, such that the plane of equal height of the pedals is below the mid-height of the closed trajectories, the device comprising:
- coupling means for coupling a rotation of a drive shaft (2) about the axis (9) to the time-shifted movements of a right pedal (10, 30) and left pedal (60, 80), and
- guide means for limiting the movement of each pedal to a closed curved trajectory (12, 40, 41, 42) having a top part and a bottom part on either side of a plane where the pedals are at equal height,
- wherein the coupling means and the guide means form part of a transmission mechanism which defines for each pedal, upon the angular speed of rotation of the drive shaft about the axis being constant, a greater average speed in the top part than in the bottom part, such that the plane of equal height is below the mid-height of the closed trajectories,
- wherein the transmission mechanism is suited to substantially equalizing the speeds (45, 46) of the pedals (10, 30, 60, 80) when they are in the plane of equal height.

8. The pedaling device according to claim 7, wherein the drive shaft (2) passes through a frame and in that the transmission mechanism comprises for each pedal (10, 60):
- a guide crank (11, 61), articulated to the frame and not integral with the drive shaft, and
- a pedal pivot (8, 58) connecting the pedal to the guide crank.

9. The pedaling device according to claim 7, wherein the transmission mechanism comprises for each pedal:
- a driving crank (3, 53), integral with the drive shaft (2),
- a transmission pivot (6, 56) connecting the pedal to the driving crank, and
- a distance varying means (4, 5, 54, 55) for varying the distance between the axis of said transmission pivot (6, 56) and the axis of the drive shaft (2) during the rotation of the shaft.

10. The pedaling device according to claim 9, wherein the drive shaft passes through a frame and in that the transmission mechanism further comprises for each pedal:
- a guide crank (11, 61), articulated to the frame and not integral with the drive shaft, and
- a pedal pivot (8, 58) connecting the pedal (10, 60) to the guide crank, and
- a connecting rod (7, 57) carrying the pedal pivot (8, 58) and the transmission pivot (6, 56).

11. The pedaling device according to claim 10, wherein the pedal (10, 60) is integral with the connecting rod (7, 57).

12. The pedaling device according to claim 10, wherein each guide crank (11, 61) is articulated to the frame by a frame pivot (14, 64) substantially coaxial with the drive shaft (2).

13. The pedaling device according to claim 12, wherein for each pedal (10, 60) the distance between the axis of the pedal pivot (8, 58) and the axis of the transmission pivot (6, 56) is approximately equal to half the distance between the axis of the frame pivot (14, 64) and the axis of the pedal pivot (8, 58).

14. The pedaling device according to claim 9, wherein the drive shaft (2) passes through a frame and in that the transmission mechanism also comprises for each pedal (30, 80):
- two guide cranks (31, 32, 81, 82), each articulated to the frame by a frame pivot (33, 34, 35, 36) and separate from the drive shaft, and
- two pedal pivots (28, 29, 78, 79) each connecting the pedal (30, 80) to one of the two guide cranks, and
- a connecting rod (27, 77) carrying the transmission pivot (6, 56) and integral with the pedal.

15. The pedaling device according to claim 14, further comprises means (65, 66, 67, 68, 62, 63, 72, 73, 74, 75) for stabilizing the guide cranks (31, 32, 81, 82).

16. The pedaling device according to claim 12, wherein for each pedal (10, 30, 60, 80) the minimum distance between the axis of the transmission pivot (6, 56) and the axis of the drive shaft (2) is approximately equal to half the distance between the axis of the frame pivot (14, 64, 33, 34, 35, 36) and the axis of the pedal pivot (8, 58, 28, 29, 78, 79) connected by one of the guide cranks (11, 61, 31, 32, 81, 82).

17. The pedaling device according to claim 12, wherein for each pedal (10, 30, 60, 80) the maximum distance between the axis of the transmission pivot (6, 56) and
- the axis of the drive shaft (2) is approximately equal to 1.5 times the distance between the axis of the frame pivot (14, 64, 33, 34, 35, 36) and the axis of the pedal pivot (8, 58, 28, 29, 78, 79) connected by one of the guide cranks (11, 61, 31, 32, 81, 82).

18. The pedaling device according to claim 9, wherein the means for varying the distance include for each pedal:
- a groove (4, 54) along the driving crank (3, 53), and
- a roller (5, 55) free to move by rolling in the groove, and connected to the transmission pivot (6, 56).

19. The pedaling device according to claim 18, wherein for each pedal the width of the groove is substantially greater than the diameter of the roller.

20. The pedaling device according to claim 9, wherein the distance varying means further varies the effective length of the driving cranks.

21. The pedaling device according to claim 7, wherein the transmission mechanism comprises:
- a secondary shaft having a second axis (15) substantially parallel to the drive shaft,
- means for coupling a rotation of the drive shaft about the axis to a rotation of the second axis (15) of the secondary shaft about the axis (9) of the drive shaft and to a rotation of the secondary shaft about the second axis (15),
- and in that the transmission mechanism also comprises for each pedal:
- a secondary crank (16, 17), integral with the secondary shaft, and
- a pedal pivot (8, 58) connecting the pedal to the secondary crank.

22. The pedaling device according to claim 21, further comprising:

the coupling means are arranged such that the axis (15) of the secondary shaft rotates freely about the axis (9) of the drive shaft at an angular speed substantially equal to the double of the angular speed of rotation of the secondary shaft about the second axis (15), and the secondary cranks (16, 17) are substantially four times longer than the radius of rotation of the axis (15) of the secondary shaft about the axis (9) of the drive shaft.

23. The pedaling device according to claim 7, wherein the transmission mechanism comprises for each pedal:

a first crank (18, 19), integral with the drive shaft, a second crank (22, 23) connected to the first crank by a secondary pivot (24, 25), and a pedal pivot (8, 58) connecting the pedal to the second crank.

24. The pedaling device according to claim 23, wherein for each pedal:

the drive shaft (2) and the first (18, 19) and second (22, 23) cranks are coupled such that the second crank (22, 23) rotates freely about the axis of the secondary pivot (24, 25) at an angular speed approximately equal to the double of the angular speed of rotation of the axis of the secondary pivot (24, 25) about the axis (9) of the drive shaft, and the first crank (18, 19) is approximately four times longer than the second crank (22, 23).

25. The pedaling device according to claim 7, further comprises a driving power transmission means for transmission of a driving power from the drive shaft to a device consuming the driving power.

26. The pedaling device according to claim 7, integrated with a vehicle or a static sports training device.

* * * * *